United States Patent
Katzakian et al.

(10) Patent No.: US 9,169,386 B2
(45) Date of Patent: Oct. 27, 2015

(54) ORGANIC VEGETABLE OIL BASED RESIN AND PREPARATION METHOD THEREOF

(75) Inventors: Arthur Katzakian, Elk Grove, CA (US); Craig Katzakian, Sacramento, CA (US)

(73) Assignee: ECO GREEN RESINS, LLC, Henderson, NV (US)

( * ) Notice: Subject to any disclaimer, the term of this patent is extended or adjusted under 35 U.S.C. 154(b) by 115 days.

(21) Appl. No.: 12/606,980

(22) Filed: Oct. 27, 2009

(65) Prior Publication Data

US 2011/0098395 A1      Apr. 28, 2011

(51) Int. Cl.
| | |
|---|---|
| C08K 5/15 | (2006.01) |
| C08L 63/00 | (2006.01) |
| C08G 59/02 | (2006.01) |
| C08G 59/42 | (2006.01) |
| C08K 5/101 | (2006.01) |
| C08K 3/32 | (2006.01) |
| C08K 5/092 | (2006.01) |
| C08K 5/1515 | (2006.01) |

(52) U.S. Cl.
CPC ............ C08L 63/00 (2013.01); C08G 59/027 (2013.01); C08G 59/42 (2013.01); C08G 59/4215 (2013.01); C08K 3/32 (2013.01); C08K 5/092 (2013.10); C08K 5/101 (2013.01); C08K 5/1515 (2013.01)

(58) Field of Classification Search
CPC ...... C08G 59/42; C08G 59/4215; C08K 5/52; C08K 5/092; C08K 5/09; C08K 5/0091; C08K 5/101; C08L 63/00
USPC ................................................ 525/523, 533
See application file for complete search history.

(56) References Cited

U.S. PATENT DOCUMENTS

| | | | | |
|---|---|---|---|---|
| 3,977,996 | A | * | 8/1976 | Katzakian et al. ............ 502/167 |
| 4,026,857 | A | * | 5/1977 | Brown et al. ................. 523/416 |
| 5,441,996 | A | * | 8/1995 | Cummings et al. ........... 523/416 |
| 6,274,750 | B1 | * | 8/2001 | Sato et al. ..................... 554/213 |
| 2001/0014399 | A1 | * | 8/2001 | Jasne ............................ 428/413 |
| 2005/0119371 | A1 | * | 6/2005 | Drzal et al. ................... 523/400 |
| 2007/0100074 | A1 | * | 5/2007 | Devonport et al. ........... 525/107 |
| 2008/0161468 | A1 | * | 7/2008 | Juikar et al. .................. 524/423 |
| 2010/0292415 | A1 | * | 11/2010 | Reynolds et al. ............. 525/533 |

* cited by examiner

Primary Examiner — Wenwen Cai
(74) Attorney, Agent, or Firm — Greenberg Traurig, LLP

(57) ABSTRACT

Disclosed are organic, UV resistant epoxy resins derived largely from vegetable oil. More specifically, the present invention provides a virtually non-toxic, hypoallergenic UV resistant resin that gives off substantially no VOCs or disagreeable odors. The composition comprises a vegetable oil-based polyfunctional carboxylic acid, a cycloaliphatic anhydride, and an epoxy compound either of bicyclic difunctional epoxy resin, epoxidized vegetable oil or epoxidized polymer chains. The composition further comprises a catalyst and a wetting agent. In its cured state the material is leather like and exhibits high tensile strength as well as unusually high, totally reversible elongation. In an alternative embodiment, the resin comprises a cyclic anhydride. With increased amounts of cyclic anhydride, increased heat distortion temperature is exhibited while maintaining a high reversible elongation and high tensile strength In an additional alternative, an increased amount of Chromium III Octoate is used and in another alternative Phosphoric Acid.

2 Claims, No Drawings

ORGANIC VEGETABLE OIL BASED RESIN AND PREPARATION METHOD THEREOF

BACKGROUND

1. Field of the Invention

The present invention relates to organic resin compositions, and more particularly to hypoallergenic and substantially non-toxic environmentally safe organic resins and a method for preparing the same, the method including polymerizing a very low toxicity cycloaliphatic bicyclic epoxy with a nontoxic functional carboxylic acid vegetable oil through incorporation of a non-toxic hypoallergenic catalyst.

2. Background of the Invention and Prior Art

Because of their low cost and abundant availability, resins from the polyester family are used in a variety of manufacturing industries. For instance, the production of fiberglass typically uses polystyrene or polyamine/epoxy curing systems. However, during fiberglass production, it is well known that there are typically high emissions of volatile organic compounds ("VOCs"). For instance, for fiberglass boat manufacturing alone, the total national VOC emissions is estimated to be 20,150 tons per year (U.S. Environmental Protection Agency, *Assessment of VOC Emissions from Fiberglass Boat Manufacturing*, May 1990, EPA-600/2-90-019. EPA's Control Technology Center at Research Triangle Park, N.C., Charles H. Darvin Project Officer). Much of the emissions are acetone and styrene. Because of the low cost of using a resin from the polyester family, their use is commonplace despite the release of environmentally damaging emissions.

Many of these polyester resins are prepared from dicarboxylic acids and difunctional alcohols, wherein the two are reacted together to create a chain comprising ester linkages. Double bonds are incorporated by reacting maleic anhydride into the polymer chain and the molecular weight is adjusted by controlling the ratio of reactants to keep the chain in liquid form for processing purposes. The chains are then linked together with styrene. A radical initiator is used to activate the styrene for reaction with the maleic double bond. When the first reaction occurs, the free radical transfers to and opens the maleic double bond, where it then reacts with the styrene double bond, opening it up to put a free radical on the styrene which then undergoes reaction with the maleic double bond as before. This continues until all the chains are linked together and/or all the styrene is consumed.

A first drawback to this means of production is that excess styrene can cause the resin matrix to become very brittle and easily broken. The styrene is also volatile, foul smelling, and toxic. Any facility preparing significant quantities of material must be extremely well ventilated, and workers generally wear a chemical respirator or use a fresh air breathing system. Even if the use of excess styrene is avoided, when this process is used to make reinforced fiberglass composites, bending loads on the cured composite can still easily make the polyester craze and crack. Finally, resin systems made under these conditions break down under ultraviolet ("UV") light due to unwanted free radical formation, ultimately resulting in a shorter lifespan for the fiberglass composite.

A second drawback relates to alterations in the cure rate of the resin. To alter the cure rate of an amine epoxy resin, the conventional method used by a manufacturer involves altering the concentration of the polymerization catalyst. Polyester based systems currently in place employ a radical initiator for the creation of reaction sites and hence if more initiator is present more reaction sites are present and the reaction runs faster. However, this also leads to shorter polymerized chains and increased cross-linking, leading in turn to a more brittle product. Unlike catalysts, initiators are consumed by the reaction. There is therefore a need for a resin with an adjustable rate of cure, wherein adjustments to the rate do not lead to adjustments in the final properties of the cured resin.

Despite these drawbacks, conventional polyester resins remain popular because they use relatively inexpensive components and are easy to apply to many applications.

The second commonly used type of resin is an amine-epoxy resin, generally comprising an aliphatic amine backbone. Resins of this type are versatile, autocatalytic (that is, the catalyst and the curing agent are one and the same) and can form polymer structures with a wide range of properties. However, to realize these wide-ranging properties, it is necessary to use an array of amine curing agents. Most common amine-epoxy systems utilize an epoxy resin produced from a reaction between epichlorohydrin and bisphenol A. Consequentially, it is not necessary to modify the epoxy structures to alter the characteristics of the end products. Instead, the amine-curing agent is generally changed, as described below. The downside of these epoxy resins is the toxicity and carcinogenic properties of the epichchlorohydrin. Indeed, in order to keep the epoxy resin from being classified as a carcinogen, manufacturers must remove excess residual epichlorohydrin. Finally, both epichlorohydrin and bisphenol A are suspected endocrine disruptors.

The aliphatic amine-curing agent for a typical amine-epoxy resin generally consists of linear chains having recurring secondary amine groups in-line every two-carbon atoms. The difference among these aliphatic amine-curing agents usually is the number of these two-carbon groups in the chain. The ends of these chains contain primary amines, which are far more reactive toward the epoxy resins than are the secondary amines along the chain. This usually means that the reaction with epoxies is fairly rapid until the primary amines have reacted. The reaction rate then slows down as the reaction continues with the secondary amines.

There are several undesirable aspects to the aliphatic amine curing agents. They usually have fair volatility and a strong disagreeable odor. The fumes and amines themselves are toxic and can cause skin irritations. These resin systems usually cure to a hard brittle stage, and, if not formulated properly, will continue to harden. Over time this can cause a significant change in properties in the final composite.

An additional negative characteristic of amine/epoxy resin systems is that the rate of the reaction cannot be changed without also changing the amine. The amine epoxy is self-catalyzing, so to change the reaction rate, the amine must be changed. For instance, for faster reactions, low molecular weight, fast reacting amines such as aliphatic amines, including ethylene diamine or diethylene triamine, may be used. This is because the terminal amine groups are primary amines, which react faster. The secondary amines react slower, thus, the longer the chain, the greater the concentration of secondary amines and the slower the reaction. Thus, for slower reactions, diethyl amines or other secondary amines may be used. Changing the amine, however, changes the properties of the final product. Additionally, like the polyester resin, the amine/epoxy resin is degraded by UV light, undergoing amine oxidization under UV exposure due to radical attack at the amine portion of the polymer, this amine oxidization goes on to cause chalking Finally, because the catalyst and the curing agent are one and the same, as the reaction progresses and the curing agent hardens, the amines and, thereby the catalysts are rendered more and more immobile.

An additional negative characteristic of both resins (polyester and amine-epoxy) is that during the course of curing, both resins exhibit undesirable cure shrinkage. Much effort has gone into reducing this shrinkage in order to produce end products that are truer to the mold on which they are based. A final downside to both resins is their elongation properties. Specifically, the amine/epoxy resin only provides for 5.0% elongation before breaking. The polyester system has even less at only 2.45% elongation before breaking.

In summary, there are thus several downsides to the above systems, including but not limited to shrinkage upon curing, poor elongation characteristics, degradation upon UV light exposure, brittleness, limited range of cure rates, and the release of harmful VOCs during production. There is thus a need for a hypoallergenic, substantially non-toxic, environmentally friendly resin that overcomes the above disadvantages.

One solution is found in recently developed epoxy resin systems that utilize cycloaliphatic-curing agents. The addition of cycloaliphatic curatives in the hardener or curing agent of epoxy resin systems greatly improves the epoxy. Cycloaliphatics are known for their improved weather resistance, tolerance to water and moisture, resistance to blushing and water spotting and better chemical resistance. In addition, they provide better impact resistance. As a downside, these new solutions are expensive, enough so that often the traditional resins are still used, despite their downsides.

It is thus an object of the present invention to provide a hypoallergenic, substantially non-toxic, environmentally friendly resin system that limits obnoxious odors, irritating fumes, and VOCs while exhibiting wide ranging cure rates and capabilities.

It is a further object of the present invention to provide a resin system wherein the final cured properties of the resin remain the same despite modifications to the rate of cure.

It is a still further object of the present invention to decrease employee exposure to toxic chemicals and thereby strongly impact the growth for small business that might otherwise be overwhelmed by the huge capital costs normally associated with meeting all the safety guidelines applied to the use of conventional composites.

It is a further object of the present invention to provide a resin that is not brittle or easily broken, that exhibits excellent elongation properties, and that does not significantly shrink during the course of resin curing.

SUMMARY OF THE INVENTION

The present invention relates to organic resins, and more particularly to hypoallergenic and substantially non-toxic environmentally safe ("green") organic resins and a method for preparing the same. Specifically, a resin is disclosed comprising hypoallergenic, very low toxicity cycloaliphatic bicyclic epoxies and hypoallergenic, nontoxic functional carboxylic acid vegetable oils. The reaction between the two is driven by the incorporation of a non-toxic hypoallergenic catalyst, the concentration of which determines the cure rate of the resin. Changes in crosslinking are accomplished using a substantially nontoxic organic cyclic anhydride. The cured products resulting from the Applicant's system exhibit unusual and unexpected mechanical properties, such as high glass transition temperatures and elongation properties of more than five to ten times that of traditional resin systems. Unlike traditional resins, the organic resins disclosed herein do not vent off or release any volatile organic compounds (VOCs) during the curing stage. Finally, during curing, the resin is not self-catalyzing, but instead is dependent on a separate catalyst. Surprisingly, the cure rate increases disproportionately to increased concentrations of catalyst, thereby making it possible to easily and vastly alter the reaction rate without altering the properties of the final cured material.

Through modifications to the preferred formulation, the cured products resulting from the methods described herein range from tough leather-like materials to hard yet resilient materials. The resin and method of making the same can thus be used in a wide array of industries for improving performance and lowering material costs relative to current systems using similar functioning composites. Further, because during the manufacturing process there are no detectable fumes and all materials are substantially non toxic, employee exposure to toxic chemicals is decreased over current systems, thereby driving down health costs and reducing the capital costs for occupational safety equipment. Specific advantages in the production of fiberglass and other fiber-reinforced polymer products are disclosed.

DETAILED DESCRIPTION OF THE INVENTION

The present invention is a unique resin composition and method for making the same. Table 1 below, discloses a preferred exemplary resin composition with the preferred range given for each constituent.

TABLE 1

Exemplary Vegetable Oil Based Resin Formulation (range)

| Ingredient | Useful range in grams* |
|---|---|
| Trimer Acid 1045 | 35-50 |
| Dimer Acid 2016 | 0-5 |
| Lindride 16E | 10-25 |
| CY179 | 25-40 |
| Chromium III Octoate | 3-6 |
| Mapeg 400 | 0.5-1.0 |

*These ranges are not independent because the system has to be balanced with respect to the stoichiometry of the resin and the curing agent As the above formulation is adjusted within the useful range, different composition characteristics are emphasized. The final composition can thus range from a tough leather-like material with a relatively low heat distortion temperature (125° F.) to rigid material with a relatively high heat distortion temperature (175° F.). Furthermore, it can be formulated for rapid cure or slow cure and high tensile strength (5,000 lbs/in.$^2$) or a more moderate tensile strength (3,000 lbs/in.$^2$). The elongation properties vary from between 20% to 35% elongation before failure depending on the specific amounts of constituents making up the composition. A single exemplary embodiment comprising the ingredients shown in table 1 is given below in table 2.

TABLE 2

Exemplary Vegetable Oil Based Resin Formulation (specific)

| Ingredient | Weight % |
|---|---|
| Trimer Acid 1045 | 40.85% |
| Dimer Acid 2016 | 1.00% |
| Lindride 16E | 17.80% |
| CY179 | 35.35% |

TABLE 2-continued

Exemplary Vegetable Oil Based Resin Formulation (specific)

| Ingredient | Weight % |
| --- | --- |
| Chromium III Octoate | 4.00% |
| Mapeg 400 | 1.00% |

Details regarding the above constituents are provided below.

Trimer Acid 1045 is a trifunctional organic acid derived from a trimerized polyunsaturated vegetable oil-based fatty acid. It provides the observed leather-like properties as well as the observed high elongation tolerance before failure. Increasing amounts of this constituent tends to make the cured resin more leather like. Although Trimer Acid 1045 (Equivalent weight is 290) is disclosed, various other Trimer Acids may be substituted.

Dimer Acid 2016 is similar to the trimer acid, but is converted to a dimerized fatty acid. It also contributes to the leather like properties, the high elongation properties of the cured products, and the lowering of the resin viscosity. Although Dimer Acid 2016 (Equivalent weight is 290) is disclosed, various other Dimer Acids may be substituted.

Lindride 16E, or cyclic anhydride is the cycloaliphatic liquid anhydride that controls the cross-link density and raises the heat distortion temperature of the cured resin. Previously, cycloaliphatics were only used with an amine catalyst, and as such required high curing temperatures. The Applicant does not require an amine catalyst, and instead reacts the cycloaliphatic system using Chromium III Octoate, which allows the reaction to run at room temperature and below. The Lindride 16E is precatalyzed by the manufacturer with a quaternary amine halide salt such as benzyltrymethylammonium chloride to promote the reactant of the anhydride with the alcohols that already exist as well as those that are formed during the cure. (Equivalent weight is 185).

Throughout the range of amounts of Lindride 16E used in a stoichiometrically balanced formulation, the composition provides high elongation properties. In an alternative embodiment of the invention, an increased amount of Lindride 16E beyond that disclosed in Table 1 is formulated into the composition. This alternative embodiment exhibits a surprising characteristic in that even though the heat distortion temperature of the material increases with increased amounts of cyclic anhydride, the cured material exhibits a high (20-35%) reversible elongation with a tensile strength in excess of 5,000 PSI. In an additional alternative embodiment of the invention, tetrahyrophthalic and hexahydrophthalic anhydride are used in place of Lindride 16E. Although these materials serve the same purpose as Lindride 16E, they do not contain the catalyst that is in Lindride 16E to promote the reaction of the anhydride with the alcohol groups that are formed in the course of the polymerization. They are liquids at and below room temperature because of mixed isomers. To speed up the reaction where anhydride is used, a catalyst such as a quaternary salt or a tertiary amine, can be added.

CY179 (formerly a product of Union Carbide called ERL4221) is the bicyclic difunctional epoxy resin that links the curing agents into a cross-linked network that provides the unusual mechanical properties observed. CY179 contains two 6-member cycloaliphatic ring units bridged together by an ester linkage and may be referred to as 3,4-Epoxycyclohexylmethy 3,4-expoxycyclohexanecarboxylate. Each ring structure contains an attached internal epoxy group. This structure adds strength and rigidity to the final cured resin composition. Other equivalent cycloaliphatic bicyclic organic epoxy resin could be used in place of CY179. Of note, because the effect of moisture contamination is to increase the demand of the Lindride 16E (which becomes difunctional) for the epoxy CY179, the CY179 is consequently formulated with up to 5% excess of stoichiometry to accommodate the increased demand should it present itself. The formulation is forgiving enough not to be affected by this excess of epoxy resin, even if no side reactions take place. When other epoxies are used, approximately 3% to 5% excess resin is also used to account for possible resin-consuming side reactions. (Equivalent weight of CY179 is 140).

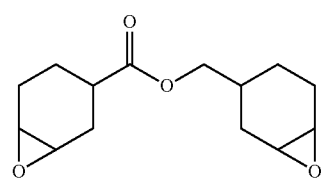

CY179

CY179 may be prepared by a three-step process. In an exemplary reaction, the first step involves the preparation of 3-cyclohexenecarboxaldehyde, which may be accomplished by reacting 1 mol of acrolein with 1 mol butadiene in a pressure vessel at 100° C. for three hours followed by fractionating the contents of the vessel under vacuum. The second step is conversion of 3-cyclohexenecarboxaldehyde to 3-cyclohexeneylmethyl-3-cyclohexenecarboxylate via reaction with aluminum isopropoxide (102 grams, 0.5 mol) dissolved in 900 grams dry benzene in a 5-liter glass flask fitted with a stirrer and a dropping funnel. While maintaining the stirred contents of the flask at 20-25 degrees Celsius, 220 grams (20 mols) of 3-cyclohexanecarboxaldehyde is added dropwise over a period of 5 hours. After all the aldehyde is added, the reaction solution is left at temperature for 16 hours and then mixed with 83 ml of concentrated hydrochloric acid before separating off the aqueous layer and fractionally distilling the organic layer, yielding 1932 grams (88% yield) of 3-cyclohexenylmethyl-3-cyclohexenecarboxylate, by 129° C.-130° C. at 3 mm Hg, ($n_D^{30}$ 1.4940).

The third step is conversion of 3-cyclohexeneylmethyl-3-cyclohexenecarboxylate to 3,4-Epoxycyclohexylmethy 3,4-expoxycyclohexanecarboxylate via reaction with peracetic acid in acetone, and subsequent reaction with ethyl benzene. Specifically, 488 grams of a 25.5 percent solution of peracetic acid in acetone (124 grams, 1.64 mols of peracetic acid) are added dropwise over a period of two and one fourth hours to 144 grams (0.655 mols) of 3-cyclohexenylmethyl-3-cyclohexenecarboxylate in a 1-liter flask. The stirred reaction solution is maintained at 20-25° C. by immersing the reaction flask in a coldwater bath. After the addition is complete, the reaction flask is immersed in a cold bath (−11° C.) and allowed to stand for 16 hours. The contents of the flask are then added dropwise to a still kettle containing ethyl benzene refluxing under reduced pressure at 40-45° C. kettle temperature. During the addition a mixture of acetone, acetic acid, peracetic acid and ethylbenzene is distilled off at the head. After the addition of the contents of the flask to the still kettle, the remaining low boiling materials are distilled off, yielding 164 grams of residue product analyzed as 86 percent purity 3,4-epoxycyclohexymethyl-3,4-epoxycyclohexane carboxylate by determination of epoxide groups, 10.7 percent unreacted 3-cyclohexenylmethyl-3-cyclohexene carboxylate by determination of double bonds, and 0.2 percent acidic impurities calculated as acetic acid. The yield of diepoxide is 85.5 percent.

Chromium III Octoate is a powerful catalyst that drives the reaction between the CY179 and Trimer acid, Dimer acid and Lindride 16E. There are at least two forms of Chromium III Octoate, one being the green form (active) and one being the blue-violet form (inactive). The green form is the form used in the present invention, available from the Shepherd Chemical Company. It is important to note that the catalyst must be modified before use in preparing the resin. The modification combines the Chromium III Octoate as prepared by Shepherd in a ratio of 80:20 with 2-ethyl hexanoic acid (2-EHE). Thus, when the present application describes 5.0% Chromium III Octoate, it may be thought of as 4.0% Chromium III Octoate and 1.0% 2-EHA (2-ethylhexanoic acid), or said again it is the 2-ethylhexanoic acid salt of Chromium III. The excess 2-EHA is added to decrease the catalyst viscosity. Suitable low viscosity plasticizers such as DOP and TXIB can also be used. However, the 2-EHA is monofunctional and becomes part of the polymer chains. Workable Chromium III Salts can also be made with other organic acids, such as oleic acid. The organic acid is what determines whether or not the salt will be low melting and determines its solubility in the polymer resin being catalyzed. 2-Ethyl hexanoic acid happens to be widely used in the preparation of transition metal salts to be used as drier catalysts for paint oils.

In an alternative embodiment of the invention, increased amounts of Chromium III Octoate are used. In this embodiment, small increases in the catalyst concentration cause large increases in the rate of cure. This is not in accord with classical chemical kinetics. A possible explanation is that because of the higher concentration, the catalyst molecule has less and less distance to travel to effect a catalyzed cure. This is important because the catalyst must travel through a viscous medium in order to cause catalysis of the carboxylic acid with the bicyclic epoxide.

Mapeg 400 is the wetting agent that enhances the wetting properties of the liquid resin so that it can rapidly penetrate the cloth used in making the composite. It is the dioleic acid (vegetable oil based) ester of polyethylene oxide.

In an alternative embodiment of the invention, a substitute to CY179 is used, due largely in part to the high cost of CY179. In this first alternative embodiment, epoxidized Linseed oil may be used.

TABLE 3

Alternative Vegetable Oil Based Resin Formulation (specific)

| Ingredient | Weight %* |
|---|---|
| Epoxidized Linseed Oil | 42.18 |
| Lindride 16 E | 22.70 |
| Trimer Acid | 29.12 |
| Mapeg 400 | 0.50 |
| Chromium III Octoate | 5.50 |

*[Contains ~70% vegetable oil based derivatives]

Epoxidized linseed oil (equivalent weight ~180) is based on the internally epoxidized vegetable oil called linseed oil (also known as flax seed oil). It is a triglycidyl ester comprising unsaturated vegetable acids having 14-18 carbons in the chain in which each of the chains contains, on average, one active double bond. Like the CY179 formulation in the preferred embodiment, the epoxidized vegetable oil-based product is virtually non-toxic and produces no VOCs or skin irritation even upon prolonged contact. It is used to promote the cure of the resin through interaction and reaction with Lindride 16E and Trimer acid. The overall reaction is driven by the addition of Chromium III Octoate. Although epoxidized linseed oil is a very sluggishly reactive polyepoxide when reacted with the usual curing agents of polyacids and anhydrides, the reaction is greatly accelerated in the presence of Chromium III Octoate. In fact, it can be formulated with Chromium III Octoate such that the overall resin will cure at ambient temperatures at about the same rate of speed as the preferred composition outlined above.

Other changes are necessary in the process of making the resin in this alternative embodiment. In order to increase the heat distortion temperature of the resin that is cured with epoxidized linseed oil, it is necessary to increase the amount of Lindride 16E. Because the equivalent weights of the Lindride 16E and the epoxidized linseed oil are nearly identical, they may be increased on an approximately one to one weight basis. At some point, however, increasing amounts of Lindride 16E will result in diminishing returns with regard to increases in the heat distortion temperature due to the difference in equivalent weight between Lindride 16E and Trimer Acid. This is because as more of the composition is made up of Lindride 16E and epoxidized linseed oil, less is made up of trimer acid. As the proportion of Lindride 16E increases beyond a certain point, the effect of the Trimer acid will begin to decrease at an accelerating rate based on the net change in cross-link concentration. The effect on heat distortion temperature and loss of elongation becomes significant as the trimer acid drops to below 15% of the formulation. At this point, the rate of increase in heat distortion temperature will begin to fall due to a drop in the rate of increase in cross-linking That is, increased amounts of Lindride 16E begin to yield diminishing returns. In any case, the level of heat distortion achieved will be more limited because of the flexible nature of epoxidized linseed oil chains compared to the more rigid CY 179 structure.

The CY179 and the linseed oil resins both use the same curing agent ingredients, namely Lindride 16E, and carboxylic acid (both Dimer and Trimer).

The Lindride 16E, which is the only non-vegetable oil based component in these formulations is still a "green" material based on its low toxicity levels. Because this alternative embodiment comprises all natural constituents, the cost for production is low compared to that of the CY179 preferred embodiment resin. Other epoxidized vegetable oil and epoxidized polymer chains are available as well. Some examples of these polyepoxides are epoxidized soybean oil and epoxidized 1,4 polybutadiene. The epoxidized soybean oil produces products that are more flexible than those produced with epoxidized linseed oil. At the present time, epoxidized linseed oil appears to be the best vegetable oil-based polyepoxide from virtually all stand points, and is the best of these alternative embodiments.

There are three modified versions of this first alternative embodiment of the invention, with the modification being the amount used of Lindride 16E. Tables 4, 5 and 6 each disclose the linseed oil resin with a different amount of Lindride 16E. Table 7 provides a range of compositions that incorporates each of the embodiments shown in Tables 4, 5 and 6. As expected, the formula in Table 4 has the lower heat distortion temperature @ 115° F., while the formula in Table 6 has the highest, at 135° F. The formula in Table 5 has a heat distortion temp of 122° F. The weight of the vegetable oil based portion of each formula as a percentage of the total of weight of each formula in Tables 4-6 are approximately 75%, 72.5% and 70%, respectively.

TABLE 4

First modified Alternative Embodiment Formulation (specific)

| Ingredient | Weight % |
| --- | --- |
| Epoxidized linseed oil | 42.70 |
| Lindride 16E | 25.08 |
| Trimer Acid | 26.22 |
| Mapeg 400 | 1.00 |
| Chromium III Octoate | 5.00 |

TABLE 5

Second modified Alternative Embodiment Formulation (specific)

| Ingredient | Weight % |
| --- | --- |
| Epoxidized linseed oil | 43.25 |
| Lindride 16E | 27.52 |
| Trimer Acid | 23.23 |
| Mapeg 400 | 1.00 |
| Chromium III Octoate | 5.00 |

TABLE 6

Third modified Alternative Embodiment Formulation (specific)

| Ingredient | Weight % |
| --- | --- |
| Epoxidized linseed oil | 43.81 |
| Lindride 16E | 30.02 |
| Trimer Acid | 20.17 |
| Mapeg 400 | 1.00 |
| Chromium III Octoate | 5.00 |

TABLE 7

Acceptable Ranges for Modified Alternative Embodiment Formulation

| Ingredient | Weight range % |
| --- | --- |
| Epoxidized linseed oil | 40-50 |
| Lindride 16E | 10-30 |
| Trimer Acid | 15-55 |
| Mapeg 400 | 0.5-1 |
| Chromium III Octoate | 3*-5 |

*This value may be as low as 0.5% if cure were to take place at elevated temperature.

In a preferred alternative embodiment of the invention, the epoxidized linseed oil from the above formulations is treated with phosphoric acid. The phosphoric acid helps to increase the crosslink density of the material, resulting in a harder material with a higher heat distortion temperature. As an exemplary formulation, the composition of Table 6 was modified to include phosphoric acid as shown:

TABLE 8

Alternative Embodiment Formulation using Phosphoric Acid (specific)

| INGREDIENTS | W/O Phosphoric Acid Wt. % | W/Phosphoric Acid Wt. % |
| --- | --- | --- |
| Epoxidized Linseed Oil | 43.81 | 48.04 |
| 50% by Wt. Aq. $H_3PO_4$ | — | 0.94 |
| Lindride 16E | 30.02 | 30.57 |
| Trimer Acid | 20.17 | 14.45 |
| Mapeg 400 | 1.00 | 1.00 |
| Chromium III Octoate | 5.00 | 5.00 |

The preferred range is 25/1 to 75/1 Linseed Oil to 50% aqueous Phosphoric Acid solution. Although approximately 50% aqueous Phosphoric Acid is preferred, a range of 25% to 75% is acceptable. Where 50% aqueous Phosphoric Acid is used, a range of acceptable amounts is shown below in Table 9.

TABLE 9

Acceptable Weight % Range for 50% Aqueous Phosphoric Acid

| INGREDIENTS | Weight Percent Range |
| --- | --- |
| Epoxidized Linseed Oil | 40.00-50.00 |
| 50% by Wt. Aq. $H_3PO_4$ | 0.25-1.00 |
| Lindride 2* | 10.00-30.00 |
| Trimer Acid | 15.00-55.00 |
| Mapeg 400 | 0.50-1.00 |
| Chromium III Octoate/Benzyldimethyl amine (90/10 by weight) | 15.00-55.00 |

*Contains no anhydride/alcohol as does Lindride 16E

The preferred method of preparing the resin according to an alternative embodiment of the invention requires the epoxidized linseed oil and the phosphoric acid to be mixed with Mapeg 400, thereby making part A of the resin. The Trimer acid and Lindride 16E are blended and the Chromium III Octoate catalyst is then stirred in to the blended mixture, the combination forming Part B of the resin. Preferably, the constituents are divided into two parts, and not combined until curing is desired. Because a cyclic dicarboxylic acid anhydride is used in this formulation, it is necessary that that portion of the composition as well as the entire resin once combined be kept away from water during curing, as water will react with the anhydride to form a dicarboxylic acid. However, because the mixed resin is mainly hydrocarbon in nature, water does not penetrate into it very rapidly, and hence only the outermost layer may be affected. This is generally only a problem with curing when one is attempting to cure the material against a wet surface.

Characteristic Improvements of the Resin

The resin is substantially non-toxic, both prior to and post curing. The overall composition is hypoallergenic, and has no VOCs and no irritating or disagreeable odor. This permits one to work with the resin without using special protective covering and filtered or fresh air breathing apparatus, as is generally required when polyesters and polyamine/epoxies are used in the manufacture of traditional resins. The product can be prepared within a closed, moderately ventilated workspace. The present system is thus ideal for the promotion of small business economic development—businesses that would otherwise not be making such a product because of the huge capital investment requirement normally associated therewith.

The nontoxic benefits above are largely because one of the primary components of the resin is vegetable oil derived, and the other primary component is a cycloaliphatic bicyclic organic epoxy resin. Epoxy resins are generally derived from bisphenol A and epichlorohydrin, both of which are considered toxic and/or carcinogenic. Rather than having the myriad toxic attributes discussed above, the cycloaliphatic bicyclic epoxy resin disclosed herein is virtually non-toxic and does not promote allergic reactions in the skin even upon prolonged contact. It is not carcinogenic or mutagenic, has no VOCs and does not even exhibit an objectionable odor.

For purposes of this patent application, toxicity is the degree to which a substance is able to damage an organism exposed to it. The Applicant considers that such a definition is necessarily dose-dependent, as even water can lead to poisoning when ingested in large enough doses, whereas even a very toxic substance can have no detectable toxic effect when taken in low enough doses. Thus, the Applicant defines non-toxic as a substance that one could ingest at an amount up to 5000 mg/kg of bodyweight and not suffer from the effects of acute toxicity. The Applicant further defines non-toxic as being harmless (that is no rash, irritation or other adverse effects) to the skin where the skin surface would be completely covered with the material in question such that the material would come into direct contact with and potentially absorb into the skin. Finally, the Applicant defines non-toxic in the general sense that not only is the material hypoallergenic, but that for all normal and practical uses the material will cause no health problems to humans or animals, from either acute or chronic exposure.

An additional benefit of the formulation described herein is with regard to its elongation properties. Unlike the polyester and amine/epoxy resins disclosed above as prior art, the Applicant's resin when cured exhibits an unusually high (and reversible) elongation for such a hard, high tensile strength, cured material. In contrast, the polyester and amine/epoxy prior art resins are quite brittle, with the polyester resin exceptionally so. When they are made into glass cloth composites, the prior art composites can withstand only a little flexing without causing delamination or breakage.

Specific again to the present application, the resin disclosed herein will elongate between 20-35% before breaking. This high elongation imparts significant resilience to the cured product. For instance, if the cured resin product is deformed but not taken to the breaking point and then allowed to sit, it will slowly and steadily recover its original shape and most of its original strength once the tensile load is removed. Recovery occurs in as little as 30 minutes when the resin is placed at a somewhat elevated temperature of approximately 50° C. After testing and reverting back to its pre-elongated length, the resin recovers at least 80% of strength. This is an unexpected but highly useful property that is not found or suggested by the prior art.

The cured resin disclosed herein also readily absorbs shocks without initiating tears or cracks. When used as a component of fiberglass or other reinforced fiber composites, a product emerges that is very hard, yet shows exceptional resiliency properties that enable it to absorb intense shocks without initiating failures. The resin and fiber work well together to produce the best properties in the composite. This behavior is not observed with other resin systems.

Table 8 shows a comparison of the cured properties of conventional polyester and amine/epoxy resins against the vegetable oil based resin disclosed herein. The properties shown for the conventional resins are values published by California-based TAP Plastics. The properties for the Vegetable Oil Based Green Resin System were measured on a Com-Ten desktop tensile tester:

TABLE 10

Mechanical Properties of Cured Resins

|  | Polyester | Amine/epoxy | Vegetable Oil Resin* |
|---|---|---|---|
| Tensile Strength, lbs/in$^2$ | 9,000 | 6,000 | 5,000 |
| Elongation, % | 2.45 | 5.00 | 20-35 |
| Heat Distortion Temp. ° F. | 155 | 145 | 165 |

[*CY179 based]

The above properties give the cured resin a great deal of resilience. To illustrate the resilience of this resin, an example is provided wherein an exemplary resin was used to prepare a 5-ply glass cloth laminate. After cure, the laminate was one sixteenth of an inch thick, and easily bendable by hand, permitting flexing back and forth without delaminating. Furthermore, the exemplary resin quickly recovers its original shape after flexing. The rate at which it recovers is a function of temperature, ranging for instance from 20-30 minutes at 90 degrees F. to 3-4 hours at 70 degrees F. Conventional glass cloth composites made from the other two resin (amine epoxy and polyester) systems delaminate and crack when subjected to the same flexing.

Regarding benefits associated with UV degradation of the cured polymers, the present system is not affected by exposure to sun or other UV light. The saturated nature of the polymer, unlike the prior art, yields linkage sites that are not prone to free radical attack or free radical cleavage.

Yet another benefit of the improved resin disclosed herein is that the resin undergoes little to no shrinkage during curing, retaining approximately 99.8% of its original volume. This comes about in the present system because the reactions that open the cyclic rings cause a volumetric expansion, which offsets the cure shrinkage effect caused by the cross-linking step. This is a dramatic improvement over the prior art, wherein the polyester resin showed significant shrinkage (3-5%) and the amine/epoxy resin showed slight shrinkage (0.5-1.0%).

Yet another benefit of the improved resin disclosed herein stems from the fact that the curing process does not permanently connect the curing agent and the catalyst to one another. The catalyst in the present system is always free to move about and catalyze the reaction without being consumed. Said again, the system is not self-catalyzing. As described above, the reaction rate of the amine/epoxy prior art system is initially rapid, but then slows as the catalyst becomes immobilized. Time to final cure is consequently lengthened, and pot-life is reduced. These downsides are completely eliminated using the formulation described herein.

Because the curing agent becomes a part of the final polymer while the catalyst does not results in resin compositions that are highly tunable simply by varying the catalyst concentration associated therewith. As described in the prior art portion of this application, conventional methods to change the reaction rate of epoxy systems required the curing agent be changed, resulting in a more highly cross-linked cured network that would be more brittle. Here, where the catalyst substantially drives the cure rate, it is possible to easily and dramatically change the reaction rate and cure rate without altering the properties of the final cured material, thereby increasing the versatility of the composition. Surprisingly, as the catalyst level is increased, the rate of cure increases disproportionately, far faster than would be predicted based on chemical kinetics.

An additional advantage of the Applicant's resin is with regard to its heat distortion (also known as heat deflection) temperature, which is the temperature at which a polymer or plastic sample deforms under a specified load. The anhydride used in the formulation provides an increase in cross-link density. The more that is used, the higher the density of cross-linking, and consequently the higher the heat distortion temperature. The unexpected behavior is that the elongation properties are only very slightly affected as heat distortion temperature is increased. Traditionally, as heat distortion temperature is increased, the elongation characteristics are reduced. Under the current system, the heat distortion temperature may be high while elongation remains high. This means that the level of anhydride can be increased to the point where the heat distortion temperature is 200° F. without significantly reducing the elongation. This gives the resin tremendous versatility and a wide range of applications.

A final advantage to the system described herein is that the catalytic activity is very sensitive to temperature. The disclosed resin can be cured at room temperature, thereby increasing the ease of manufacture. However, the cure rate is highly accelerated through increases in temperature. As a specific example, at 60° F. the resin will take about 20 hours to harden with a catalyst level of 5%; at 80° F. it will harden in about four hours. At 90° F. hardening will take place in about 30 minutes. This property will be very useful for large projects where a significant working life is very desirable. Once complete, the product can be placed in a warm (90° F.) room where it will rapidly harden. This will permit the selection of a catalyst level that gives the desired pot-life at 60° F., followed by a rapid cure at a moderately increased temperature. Although other resin systems do experience cure acceleration at elevated temperatures, the effect is not nearly as pronounced as in the present system.

The above improvements and advantages lead to new opportunities when the resins disclosed herein are utilized in specific applications. For instance, using the Applicant's resin in the preparation of reinforced composites, like fiberglass, can vastly improve the well-known VOC releases that typically occur in the curing stage. The fiberglass products made can be bent much more than traditional fiberglass products, yet still not craze or crack. Uses for fiberglass products made with the improved resin disclosed herein may include improvements to boats, auto and truck canopies, aircraft parts, corrosion resistant piping and tanks, shower stalls, bathtubs, spas, skis, sail boards, as well as improvements to non-fiberglass applications such as plywood paste or binding for bamboo strands to be used as environmentally friendly composite flooring.

With regard to the composition described in the first alternative embodiment (linseed oil composition) many of the advantages still apply. Whereas the CY179 composition is approximately 47% vegetable oil based, the linseed oil composition is approximately 70%-75% vegetable oil based. Both formulations are, however, essentially non-toxic, without VOCs, and have only a very low level pleasant vegetable oil-like odor that completely disappears upon cure. Furthermore, if the crosslinker is removed from the alternative embodiment (thereby giving the product a low heat distortion temperature), the resin can be up to 100% vegetable oil based.

The linseed oil alternative embodiment also yields cured product properties that are similar to those properties achieved with the cured CY179 formulations. The tensile strength of the cured resin in this alternative embodiment is estimated to be between 3,000-4,000 lbs. per square inch, or slightly lower than the CY179-based formulation. Elongation properties are improved, allowing for elongation of up to and including 50% before failure. Like the preferred embodiment, this alternative returns to its original shape and retains most of original strength when the strain is removed.

Although the tensile strength in the linseed oil composition is not as high as that in the CY179 composition, it is mostly compensated for by the high elongation properties, and should still prove useful in many industries. For instance, in a fifteen ply fiberglass-based cloth composite, increased flexibility, elongation properties, and resistance to cracking would offset what is lost in strength.

As shown, epoxidized linseed oil is unfortunately not quite equivalent to CY 179 in producing desirable physical properties, but nevertheless it is expected that its use will enable the product to remain "green" and possess properties that will make it useful for a variety of applications. Without significantly increasing the heat distortion of the cured resin made with epoxidized linseed oil, the material may in an exemplary use be used as an adhesive that does not require a high heat distortion temperature but only strength and good bond properties to the substrate.

The heat distortion temperature of the linseed oil variation was relatively low, on the order of 135° F., which, although it would have a lot of usefulness, would still lack many of the applications one would expect from a resin with an even higher heat distortion temperature. In the alternative formulation described in Table 7 (linseed oil and phosphoric acid), this heat distortion temperature increases to approximately 160° F., and tensile strength increases from approximately 3200 lbs./in$^2$ to ~4000 lbs./in$^2$.

The increases in heat distortion temperature and tensile strength are significant, making the phosphoric acid-based formulation broadly useful. Thus, the increases in heat distortion temperature must be due to the addition of phosphoric acid. It is not known exactly why the phosphoric acid treatment resulted in a cured resin with a much higher heat distortion temperature when the level of Lindride 16E is constant between the two. Lindride 16E is a cyclic anhydride that is not derived directly from a vegetable oil, and ordinarily, formulations made with this anhydride have either a low glass transition temperature or are rigid at room temperature. Thus, it was unexpected and fortuitous that these properties were exhibited in combination with the above constituents.

With respect to the above description then, it is to be realized that material disclosed in the applicant's drawings and description may be modified in certain ways while still producing the same result claimed by the applicant. Such variations are deemed readily apparent and obvious to one skilled in the art, and all equivalent relationships to those illustrated in the drawings and equations and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact disclosure shown and described, and accordingly, all suitable modifications and equivalents may be resorted to, falling within the scope of the invention.

We claim:
1. An epoxy resin composition comprising:
   35%-50% by weight of trimer acid;
   10%-25% by weight of cyclic anhydride pre-catalyzed with a quaternary amine halide salt;
   25%-40% by weight of 3,4-Epoxycyclohexylmethy-3,4-expoxycyclohexane carboxylate;
   3%-6% by weight of an 80%/20% mixture of Chromium III Octoate with 2-ethyl hexanoic acid; and
   0.5%-1.0% by weight of dioleic acid ester of polyethylene oxide.
2. The epoxy resin composition of claim 1 further comprising about 0%-5% by weight of dimer acid.

* * * * *